United States Patent
Kalish

(10) Patent No.: US 7,636,329 B2
(45) Date of Patent: Dec. 22, 2009

(54) WIRELESS LOCAL AREA NETWORK PROCESSING DEVICE HAVING MULTIPLE PARALLEL RADIOS

(75) Inventor: Alexander E. Kalish, Pinehurst, TX (US)

(73) Assignee: Agere Systems Inc., Allentown, PA (US)

( * ) Notice: Subject to any disclaimer, the term of this patent is extended or adjusted under 35 U.S.C. 154(b) by 1118 days.

(21) Appl. No.: 10/630,405

(22) Filed: Jul. 30, 2003

(65) Prior Publication Data
US 2005/0025102 A1 Feb. 3, 2005

(51) Int. Cl.
*H04L 5/16* (2006.01)
(52) U.S. Cl. ....................... 370/296; 709/208
(58) Field of Classification Search ........... 370/342, 370/349, 310.1, 312, 314, 321, 322, 328, 370/329, 331, 332, 336, 338, 310.2, 278, 370/296, 337, 347; 455/403, 407, 408, 463, 455/456.5, 456.6; 709/208, 209
See application file for complete search history.

(56) References Cited

U.S. PATENT DOCUMENTS 6,147,983 A * 11/2000 Backstrom ............ 370/330
6,496,499 B1 * 12/2002 Hamilton et al. ........... 370/348
6,567,653 B1 * 5/2003 Sanders ................ 455/126
6,650,630 B1 * 11/2003 Haartsen ................ 370/345
2004/0198421 A1 * 10/2004 Coan .................. 455/552.1

OTHER PUBLICATIONS

SMC © Networks, "SMC2404WBR—Barricade™ Turbo 11/22 Mbps Wireless Cable/DSL Broadband Router," http://www.smc.com, 2 pages, 2003.
"SMC Barricade Turbo 11/22 Mbps Wireless Cable/DSL Broadband Router," http://www.80211-planet.com/reviews/print.php/1577961, 3 pages, Jan. 31, 2003.

* cited by examiner

*Primary Examiner*—Brenda Pham
(74) *Attorney, Agent, or Firm*—Ryan, Mason & Lewis, LLP

(57) ABSTRACT

A wireless network processing device, such as a user device or an access point device, comprises multiple radios preferably configured in parallel and coupled to a common controller. One of the radios of the processing device is designated as a master radio and one or more of the remaining radios are designated as slave radios. The processing device is configured such that in a particular mode of operation the master radio only transmits data and the one or more slave radios only receive data, or the master radio only receives data and the one or more slave radios only transmit data.

19 Claims, 4 Drawing Sheets

WIRELESS LOCAL AREA NETWORK PROCESSING DEVICE HAVING MULTIPLE PARALLEL RADIOS

FIELD OF THE INVENTION

The present invention relates generally to communication systems, and more particularly to wireless local area networks (LANs).

BACKGROUND OF THE INVENTION

In conventional wireless LANs, user devices such as personal computers and personal digital assistants (PDAs) communicate with access point (AP) devices in accordance with specified standards. One such standard is described in the Institute of Electrical and Electronics Engineers (IEEE) 802.11b standards document, which is incorporated by reference herein. The 802.11b standard supports data rates of up to 11 Mbps in the 2.4 GHz industrial, scientific and medical (ISM) band, using direct sequence spread spectrum (DSSS).

A considerable amount of effort has been directed to increasing the data bandwidth capabilities of wireless LAN standards such as 802.11b. For example, the 802.11a standard has recently been developed, which supports data rates of up to 54 Mbps in the 5 GHz band using orthogonal frequency division multiplexing (OFDM). Another recently-developed standard is 802.11g, which can support data rates of up to 54 Mbps in the 2.4 GHz band, using DSSS for data rates below 20 Mbps, and OFDM for data rates above 20 Mbps. The 802.11a and 802.11g standards documents are also incorporated by reference herein.

A problem associated with the development of the above-noted 802.11a and 802.11g standards is that these standards generally require new transceiver hardware in order to support the higher data rates. For example, the OFDM-based radios used in 802.11a are not interoperable with the DSSS-based radios used in 802.11b. Similarly, although 802.11g is compatible with 802.11b at data rates below 20 Mbps, it requires different hardware to support the higher data rates. Therefore, those users that have already installed 802.11b hardware are unable to avail themselves of higher data rates without replacing that hardware.

Another approach is utilized in the Texas Instruments ACX100 wireless chipset. This chipset supports two different modes of operation, namely an 802.11b-compatible mode which supports data rates of up to 11 Mbps, and an enhanced "turbo" mode which supports data rates of up to 22 Mbps. However, this approach suffers from the same problem as the recently-developed 802.11a and 802.11g standards, in that specialized hardware is required in order to increase the data rate beyond that supported by the 802.11b standard.

Accordingly, a need exists for alternative techniques for increasing the data bandwidth capabilities of wireless LAN processing devices, such as user devices and access points configured in accordance with the 802.11b standard, without requiring replacement of the existing transceiver hardware.

SUMMARY OF THE INVENTION

The present invention provides improved techniques for configuring and operating wireless local area networks (LANs).

In accordance with one aspect of the invention, a wireless network processing device, such as a user device or an access point device, comprises multiple radios. The multiple radios are preferably configured in parallel and coupled to a common controller. One of the radios of the processing device is designated as a master radio and one or more of the remaining radios are designated as slave radios. The processing device is configurable such that in a particular mode of operation the master radio only transmits data and the one or more slave radios only receive data, or the master radio only receives data and the one or more slave radios only transmit data.

By way of example, a user device in the above-noted particular mode of operation may communicate in a full-duplex manner with an access point having a plurality of radios, one of which is designated as a master radio and one or more of the remaining ones of which are designated as slave radios.

Similarly, the user device in the above-noted particular mode of operation may communicate in a half-duplex manner with an access point having a plurality of radios, one of which is designated as a master radio and one or more of the remaining ones of which are designated as slave radios.

In accordance with another aspect of the invention, the processing device may be operable in a mode of operation in which data to be transmitted by the device may be separated into portions, with certain portions being transmitted by the master radio and other portions being transmitted by the slave radios. For example, a given packet to be transmitted may be separated into portions, with different portions of the packet being transmitted by the master radio and one or more of the slave radios. The portions of the given packet may be transmitted utilizing a predetermined sequence of the plurality of radios beginning with the master radio. One possible such sequence is a round-robin sequence which cycles through the plurality of radios. After transmission of a final portion of a given packet, the predetermined sequence is reset such that the first portion of the next packet is transmitted by the master radio.

In accordance with a further aspect of the invention, the multiple radios of the given processing device may be assigned network names in accordance with a convention which indicates the master or slave designation of each of the radios.

The processing device may be operable in a variety of other modes of operation. For example, a multiple-radio user device in accordance with the invention may be operable in at least one additional mode of operation in which each of the plurality of radios is operative to establish a separate and independent connection with one or more access points.

Advantageously, the present invention in an illustrative embodiment thereof substantially increases the data bandwidth capabilities of user devices and access point devices. This increase in data bandwidth capability is provided in a manner that is fully compliant with the existing standards, such as the IEEE 802.11b standard, and thus without requiring the replacement of existing transceiver hardware in the wireless LAN.

DETAILED DESCRIPTION OF THE INVENTION

The invention will be illustrated herein in conjunction with exemplary wireless LANs which include transceiver hardware configured in accordance with a wireless LAN standard such as the IEEE 802.11b standard. It should be understood, however, the invention is not limited to use with this particular standard, or to use in the exemplary wireless LAN configurations shown and described in conjunction with the illustrative embodiments. The invention is more generally applicable to any wireless networking application in which it is desirable to provide enhanced data bandwidth capability for a given transceiver hardware type. The invention does not require the particular elements of the illustrative embodiment, and other elements can be used in addition to or in place of the particular elements shown.

The term "processing device" as used herein is intended to include, by way of example and without limitation, any processor-based device capable of communicating within a wireless LAN. A processing device may thus be an access point (AP) device or a user device such as a desktop computer, portable computer, PDA, mobile telephone, etc.

The term "radio" as used herein is intended to include, by way of example and without limitation, a radio module or any other type of transceiver capable of supporting inter-device communication within a wireless LAN.

Figure 1A:
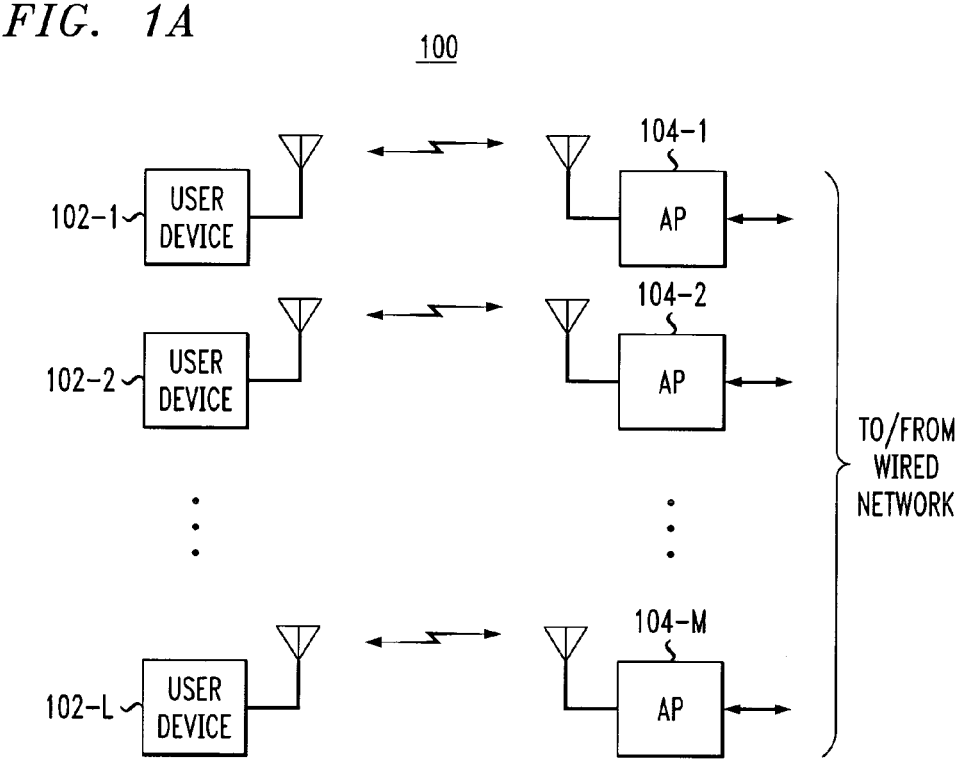
FIG. 1A shows a communication system comprising a wireless LAN configured in accordance with the invention.

FIG. 1A shows a communication system 100 which includes a wireless LAN configured in accordance with an illustrative embodiment of the invention. The system 100 includes a number of user devices 102-1, 102-2, . . . 102-L, which communicate with AP devices 104-1, 104-2, . . . 104-M. The particular values of L and M are purely arbitrary, as the system 100 may include any desired number of user devices and AP devices, in any configuration. As shown in the figure, each of the user devices and the AP devices has an antenna associated therewith. Also, each of the AP devices provides an interconnection with a wired network, such as a public switched telephone network (PSTN), Internet, intranet, extranet, wired LAN or other wired network, not explicitly shown in the figure.

The user devices may comprise otherwise conventional processing devices, such as desktop or portable personal computers, PDAs, mobile telephones, or any other type of device which can operate as an element of a wireless LAN, suitably modified to incorporate the enhanced wireless LAN functionality of the present invention. Similarly, the AP devices may comprise otherwise conventional AP devices suitably modified to incorporate the enhanced wireless LAN functionality of the present invention. The conventional aspects of such user devices and AP devices are well-known in the art and therefore will not be described in further detail herein.

Figure 1B:
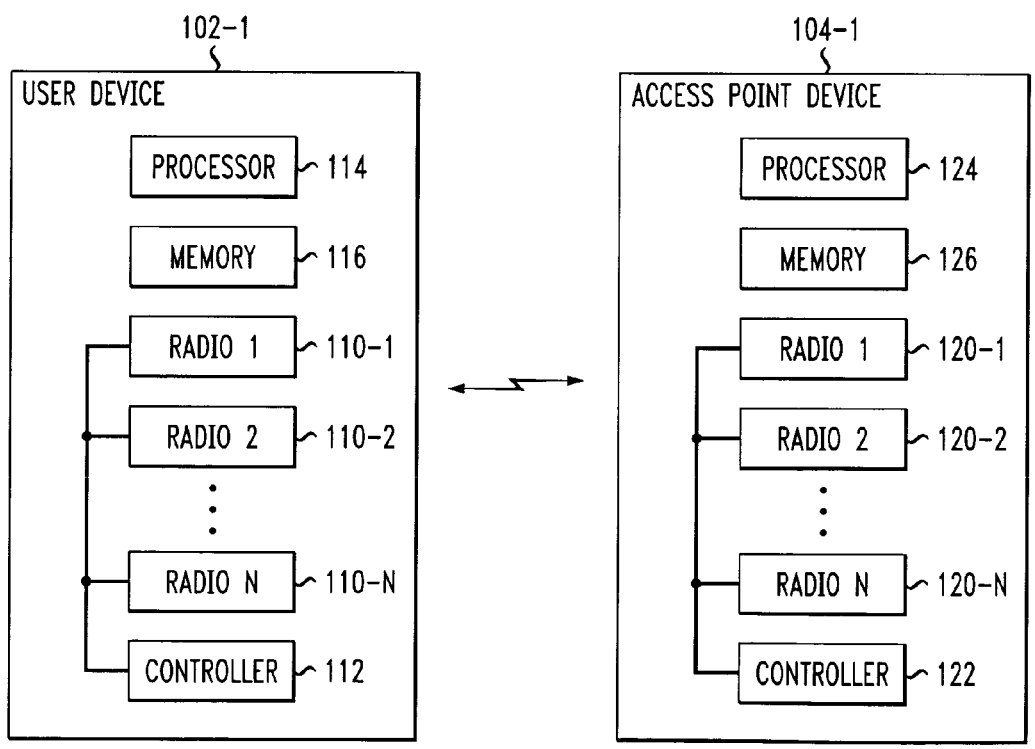
FIG. 1B illustrates a given user device and associated access point device of the FIG. 1A system, each configured to include multiple parallel radios in accordance with the invention.

FIG. 1B shows a more detailed view of a given user device 102-1 and an AP device 104-1 of the system 100. In accordance with an aspect of the invention, both the user device 102-1 and the AP device 104-1 are configured to include multiple parallel radios. More specifically, the user device 102-1 includes radios 110-1, 110-2, . . . 110-N arranged in parallel and coupled to a controller 112. The user device 102-1 also includes a processor 114 and a memory 116. Similarly, the AP device 104-1 includes radios 120-1, 120-2, . . . 120-N arranged in parallel and coupled to a controller 122, and further includes a processor 124 and a memory 126.

The particular number of parallel radios in a given user device or AP device is arbitrary, and any desired number of such radios may be used. In the examples described below in conjunction with FIGS. 2, 3 and 4, a given user device is shown as including three parallel radios, denoted 210-1, 210-2 and 210-3, although more or fewer radios may be used in other implementations.

Each of the radios in a given group of parallel radios in user device 102-1 or AP device 104-1 may have its own antenna. Alternatively, a single antenna may be used for the group, with each radio being coupled to antenna via a circulator or other suitable coupling element or network of a type known in the art.

One or more of the other user devices and AP devices of the system 100 of FIG. 1A may, but need not, be configured in a manner similar to that shown for user device 102-1 and AP device 104-1 in FIG. 1B.

It should be noted that although both the user device 102-1 and the AP device 104-1 are illustrated in FIG. 1B as including parallel radios, this is not a requirement of the invention. For example, in other embodiments, only the user device may include such an arrangement of parallel radios, with the AP device being entirely conventional in design. Moreover, the user device and AP device, if both equipped with parallel radios in accordance with the invention, need not have the same number of parallel radios.

In this illustrative embodiment, it is assumed without limitation that each of the parallel radios 110-1, 110-2, . . . 110-N of the user device 102-1 is configured to operate in accordance with a communication protocol of a wireless LAN standard, such as the IEEE 802.11b standard. Again, this assumption is made for purposes of simplicity and clarity of illustration only. Other embodiments of the invention can utilize other wireless LAN standards, non-standard implementations, or combinations thereof.

The controller 112 in the user device 102-1 may comprise a medium access controller (MAC) and a multiplexer/arbitrator, as will be described in greater detail in conjunction with FIGS. 2, 3 and 4 below. The term "multiplexer/arbitrator" as used herein is intended to include a multiplexer, an arbitrator, or both a multiplexer and an arbitrator. The controller 122 in the AP device 104-1 may be configured in a similar manner.

The processors 114, 124 and memories 116, 126 of the respective user device and AP device are operative to execute one or more software programs associated with the provision of the wireless LAN functionality described herein. Although controllers 112 and 122 are each shown as being separate elements relative to their associated processor and memory, such controllers may be implemented at least in part in the form of software which is stored in the associated memory and executed by the associated processor.

It is also to be appreciated that the user device 102-1 and AP device 104-1 in the illustrative embodiment may further include, in addition to or in place of the particular modules or other elements shown in FIG. 1B, additional modules and other elements of a type commonly found in conventional implementations of such devices. These conventional modules and other elements, being commonly used in the art, will not be described in detail herein.

In the illustrative embodiment of the invention, the user device 102-1 is configured to support a number of different modes of operation. These modes of operation will be described in greater detail below in conjunction with FIGS. 2, 3 and 4.

In a particular one of these modes of operation, a given one of the plurality of radios 110-1, 110-2, . . . 110-N of the user device 102-1 is designated as a master radio and one or more of the remaining radios of the user device are designated as slave radios. Furthermore, the user device in this particular mode of operation is configured such that the master radio only transmits data and the one or more slave radios only receive data, or the master radio only receives data and the one or more slave radios only transmit data.

Similar designations may be made for the multiple-radio AP device 104-1 in communication with the user device 102-1. More specifically, in the particular mode of operation, one of the plurality of radios 120-1, 120-2, . . . 120-N of the AP device may be designated as a master radio and one or more of the remaining radios of the AP device designated as slave radios. In the particular mode of operation, the AP device is configured such that the master radio only transmits data and the one or more slave radios only receive data, or the master radio only receives data and the one or more slave radios only transmit data. The configuration of the AP device is generally complementary to that of the user device with which it communicates, and these devices may periodically switch between master radio transmit and master radio receive as necessary within a given mode of operation. Numerous other modes of operation are also possible, as will be apparent from the following description.

A significant advantage of the illustrative embodiment of the invention is that it substantially increases the data bandwidth capabilities of the user device 102-1 and AP device 104-1 in a manner that is fully compliant with the existing standards, such as the IEEE 802.11b standard, and thus without requiring the replacement of existing transceiver hardware in the wireless LAN.

At power up of the user device 102-1, a single one of the radio modules 210-1, 210-2 or 210-3 is utilized to establish a connection with a given access point in a substantially conventional manner, for example, using the techniques of the 802.11b standard. This single radio module may be the same radio module that is designated in certain modes of operation as a master radio. Once such a connection has been established in a conventional manner, a number of distinct modes of operation are possible.

These modes of operation in the illustrative embodiment will now be described in greater detail with reference to FIGS. 2, 3 and 4. It will be assumed for purposes of illustration that the 802.11b standard is supported by each of the radio modules 210-1, 210-2 and 210-3 of the user device 102-1.

Figure 2A:
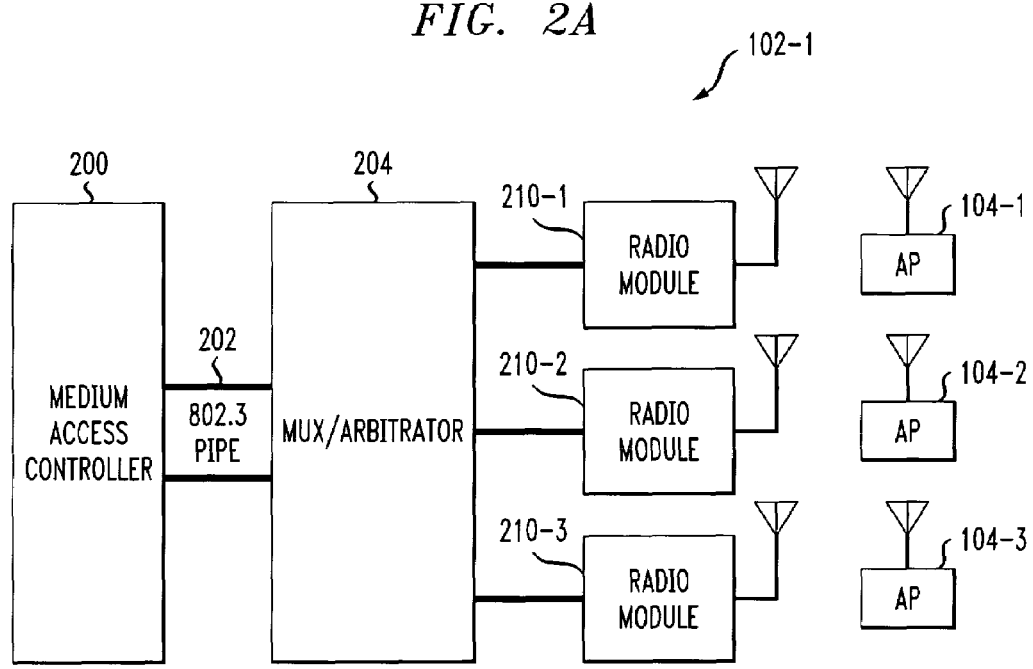
FIGS. 2, 3 and 4 show example configurations of a user device of the FIG. 1A system and a multiplexer/arbitrator of the user device, in various modes of operation of the user device.
Figure 2B:
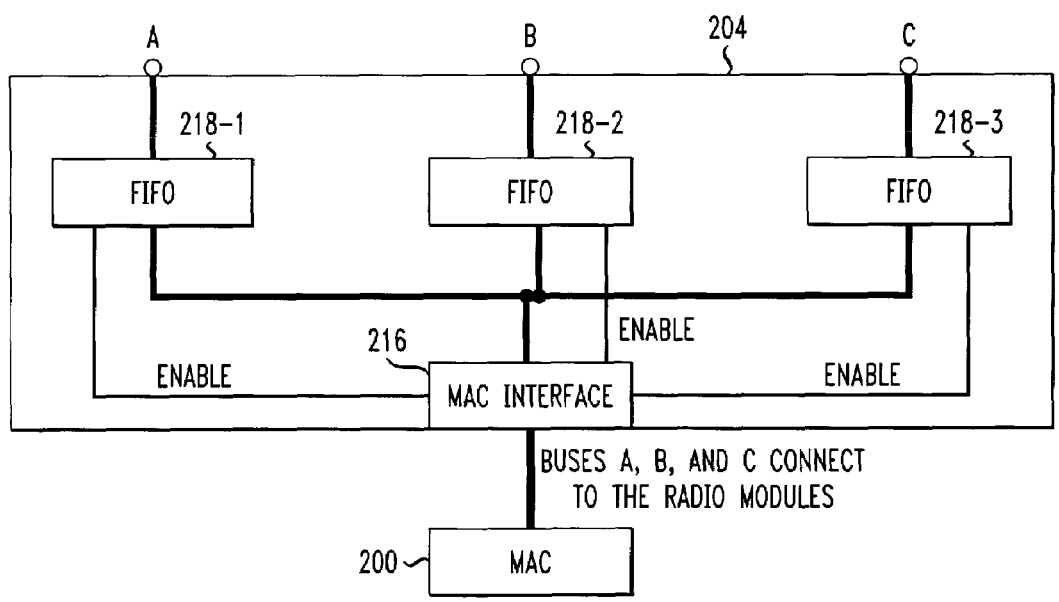

Referring initially to FIG. 2, an example configuration of the user device 102-1 is shown in FIG. 2A, and a more detailed view of the MAC and multiplexer/arbitrator elements thereof is shown in FIG. 2B.

The user device 102-1 as shown in FIG. 2A includes a MAC 200 coupled via connection 202 to a multiplexer/arbitrator 204. The MAC 200 may be, by way of example, a conventional 100 Mbps MAC. The connection 202 may be, for example, a "pipe" or other communication channel configured in accordance with the IEEE 802.3 standard, the corresponding standards document being hereby incorporated by reference herein. The user device 102-1 in this example further includes the three radio modules 210-1, 210-2 and 210-3, each having an associated antenna as shown.

As indicated in FIG. 2B, the multiplexer/arbitrator 204 includes a MAC interface 216 coupled to first-in first-out (FIFO) buffers 218-1, 218-2 and 218-3. Each of the buffers 218-1, 218-2 and 218-3 is coupled via a corresponding one of the buses A, B and C to a corresponding one of the radio modules 210-1, 210-2 and 210-3.

FIG. 2 illustrates a mode of operation in which each of the multiple radio modules 210-1, 210-2 and 210-3 establishes a separate and independent connection with a different AP device, as shown in FIG. 2A. For example, the first radio module 210-1 at power up may establish a connection with the AP device 104-1. The remaining radio modules 210-2 and 210-3 subsequently establish connections with respective AP devices 104-2 and 104-3. Each of the AP devices may occupy a distinct frequency, and may be part of the same or different network or subnetwork. Moreover, these devices need not include multiple parallel radios as shown in FIG. 1B. Each of the connections in this mode is established in a substantially conventional manner, and is fully compliant with the 802.11b standard supported by the corresponding radio module.

The multiplexer/arbitrator 204 as shown in FIG. 2B in this mode of operation is configured such that an enable signal is sent by the MAC interface 216 to each of the FIFO buffers 218-1, 218-2 and 218-3, allowing these FIFO buffers to communicate with their corresponding radio modules.

Figure 3A:
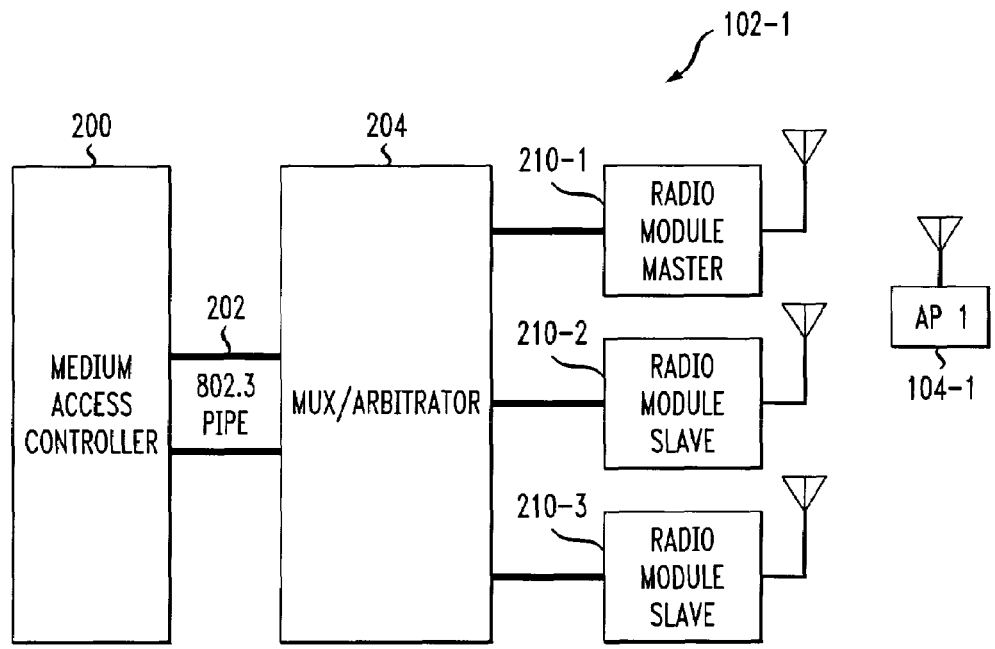

FIG. 3 shows another mode of operation in which, with reference to FIG. 3A, a given one of the radio modules 210-1, 210-2 and 210-3, namely the radio module 210-1, is designated as a master radio and the remaining radio modules 210-2 and 210-3 are designated as slave radios. The user device in this particular mode of operation is configured such that the master radio 210-1 only transmits data, while the slave radios 210-2 and 210-3 only receive data, or the master radio 210-1 only receives data, while the slave radios 210-2 and 210-3 only transmit data.

The radio modules 210-1, 210-2 and 210-3 communicate with AP device 104-1, which is configured such that one of the plurality of radios 120-1, 120-2, . . . 120-N thereof is designated as a master radio and the remaining radios of the AP device 104-1 are designated as slave radios. As indicated above, the AP device may be configured in a manner that is complementary to the configuration of the user device. That is, if the user device master radio is transmitting, the AP device master radio is receiving, and vice-versa. Again, a given device may periodically switch between master radio transmit and master radio receive.

Figure 3B:
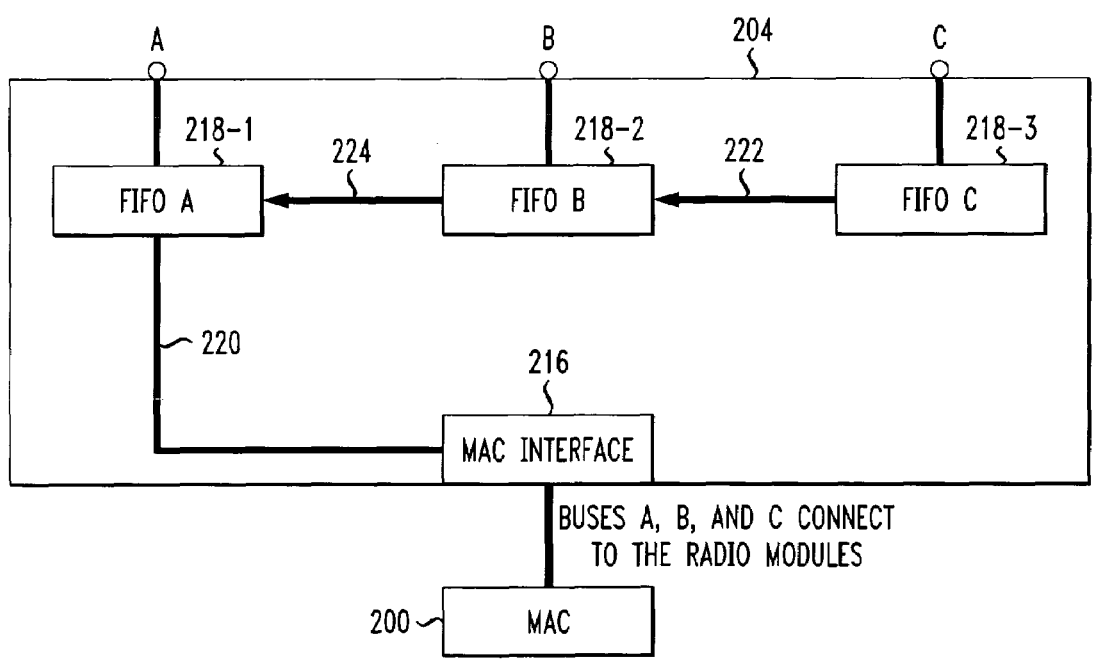

Referring now to FIG. 3B, the operation of the multiplexer/arbitrator 204 of the user device 102-1 in this mode of operation is as follows. It is assumed for this illustration that the master radio 210-1 only transmits data, while the slave radios 210-2 and 210-3 only receive data. A bus 220 between MAC interface 216 and FIFO buffer 218-1 operates as a bidirectional bus. In addition, received data from buses B and C associated with respective FIFO buffers 218-2 and 218-3 moves synchronously via buses 222 and 224 to the FIFO buffer 218-1, in the direction indicated by the arrows, and then via bus 220 to the MAC interface 216.

A similar bus arrangement may be used in configuring the user device such that master radio 210-1 only receives data, while the slave radios 210-2 and 210-3 only transmit data.

It should be noted that the AP device 104-1 may also include a MAC and associated multiplexer/arbitrator, configured to operate in a manner similar to that described in conjunction with the user device 102-1.

The mode of operation illustrated in FIG. 3 may be viewed as one example of a full-duplex mode of operation, with all multiplexing and demultiplexing of packet data preferably being performed at the physical layer of the user and AP devices in the multiplexer/arbitrators of the associated controllers.

In another mode of operation, not specifically illustrated in the figures, the user device 102-1 may be configured to transmit data in the following manner, through operation of the MAC 200 and multiplexer/arbitrator 204. Generally, packet data to be transmitted by the user device may be separated into portions, with certain portions being transmitted by the master radio 210-1 and other portions being transmitted by the slave radios 210-2 and 210-3. Moreover, certain signals associated with the packet data, such as preambles and beacons, are transmitted by the master radio 210-1.

As a more particular example, the master radio 210-1 may be configured to transmit a preamble and beacon associated with a set of data packets. Each of the data packets are divided into datagrams, fragments or other portions that are transmitted in round-robin fashion, or in accordance with another predetermined sequence, using both the master radio 210-1 and the slave radios 210-2 and 210-3. The preamble in this example may be an extension to the 802.3 packet frame, utilizable for wireless network "housekeeping" and other functions. The beacon may be a wireless packet type used to denote a particular network.

In this example transmission format, the master radio 210-1 initially sends the preamble, beacon and a first portion of a given packet, the first slave radio 210-2 sends a second portion of the given packet, and the third slave radio 210-3 sends a third portion of the given packet. A further portion of the given packet may then be sent by the master radio 210-1, with the process repeating until the given packet is sent in its entirety. At this point, the transmission sequence is reset so as to begin again with the master radio 210-1 for the next packet. Such resetting can also occur upon receipt of a retransmission indication, such as a negative acknowledgment (NACK) signal.

Any given packet sent in the manner described above may be reconstructed at the receiver in a straightforward manner through suitable physical layer processing in the controller 122 of the AP device 104-1.

The AP device 104-1 may also transmit data in the manner described above in the context of the user device 102-1.

It should be noted that pieces of data other than packets may be separated into portions and transmitted as described above.

Figure 4A:
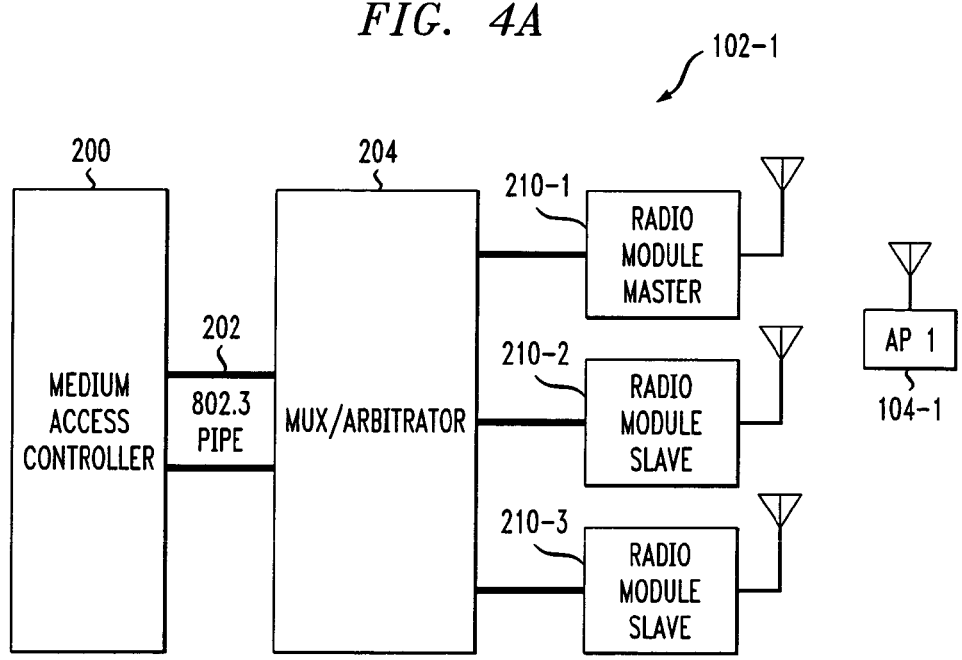
Figure 4B:
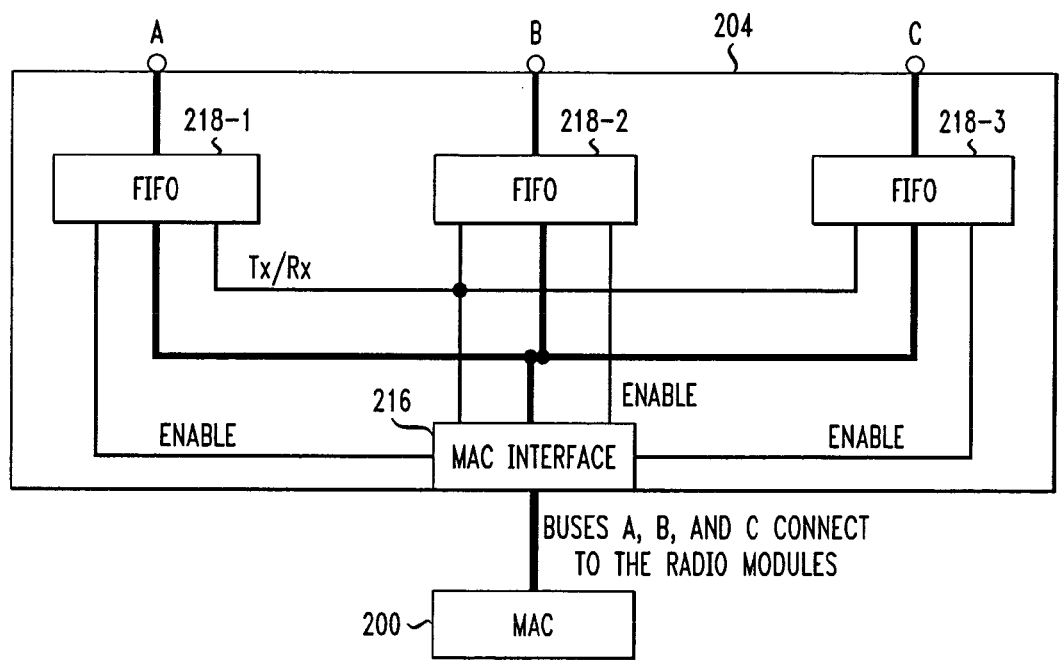

An example of a half-duplex mode of operation, utilizing the same designation of master and slave radios in the user device 102-1 and AP device 104-1 of FIG. 3, will now be described with reference to FIG. 4. In this mode of operation, the physical configuration of the user device 102-1 as shown in FIG. 4A is substantially the same as that shown in FIG. 3A. However, the multiplexer/arbitrator 204 in this mode of operation is configured differently, as indicated in FIG. 4B. More specifically, enable signals are provided from the MAC interface 216 to each of the FIFO buffers 218-1, 218-2 and 218-3, such that each of the radio modules 210-1, 210-2 and 210-3 can both transmit and receive. Transmit and receive control signals, denoted Tx/Rx in the figure, are supplied by the MAC interface 216 to the FIFO buffers 218-1, 218-2 and 218-3, and utilized to control the switching of these buffers between transmit and receive configurations. Otherwise, the transmission of packet data is handled in accordance with substantially the same multiplexing arrangement previously described in conjunction with the FIG. 3 mode of operation.

A suitable naming technique may be used to identify the current status of the multiple radios in a given processing device. For example, with reference to the AP device 104-1, the master radio, such as radio 120-1, may have any allowable 802.11b AP name, such as "WavLanNet." If an associated first slave radio is enabled, it may be assigned the name "WavLanNet_S1" to denote that it is the first slave radio associated with the master radio WavLanNet. Similarly, if an associated second slave radio is enabled, it may be assigned the name "WavLanNet_S2" to denote that it is the second slave radio associated with the master radio WavLanNet. Appropriate software implemented in the user device and AP device can be used to connect the first slave radio of the user device to the first slave radio of the AP device, to connect the second slave radio of the user device to the second slave radio of the AP device, and so on. In certain of the modes of operation referred to above, the slave radios could more specifically be noted, for example, as "WavLanNet_TxS1" or "WavLanNet_RxS1" to indicate whether the slave radio is configured to transmit only or to receive only.

The above-described embodiments of the invention are intended to be illustrative only. For example, although the illustrative embodiments are described with reference to the IEEE 802.11b standard, the invention can be used with other standards, such as IEEE 802.11a or 802.11g standards, as well as with non-standard implementations, or combinations of multiple standard or non-standard implementations. Moreover, the particular operating modes described above are provided for purposes of illustration only, and different modes may be used in other embodiments of the invention. This includes modes in which one or more of a plurality of radios are not designated as either master or slave, but can instead both transmit and receive data, while the other radios are designated as either master or slave. Furthermore, the multiplexer/arbitrators and other controller circuitry, and the associated signaling, may be implemented using a wide variety of arrangements other than those specifically shown. These and numerous other alternative embodiments within the scope of the following claims will be readily apparent to those skilled in the art.

What is claimed is:

1. A method for use in a wireless network comprising at least one user device configured for communication with at least one access point device, wherein at least a given one of the user device and the access point device comprises a plurality of radios, the method comprising the steps of:

designating one of the plurality of radios of the given device as a master radio and one or more of the remaining radios of the given device as slave radios; and configuring the given device such that in a first mode of operation the master radio only transmits data and the one or more slave radios only receive data and in a second mode of operation the master radio only receives data and the one or more slave radios only transmit data;

wherein the designating and configuring steps are performed by one or more of the user device and the access point device.

2. The method of claim 1 wherein the plurality of radios are configured in parallel to one another.

3. The method of claim 1 wherein the plurality of radios are controlled by a common controller.

4. The method of claim 1 wherein the given device comprises the user device.

5. The method of claim 1 wherein the given device comprises the access point device.

6. The method of claim 1 wherein in at least one of the modes of operation at least one of the plurality of radios both transmits data and receives data.

7. The method of claim 1 wherein each of the plurality of radios of the given device is compatible with at least one of the 802.11a standard, the 802.11b standard and the 802.11g standard.

8. The method of claim 1 wherein the multiple radios of the given device are assigned network names in accordance with a convention which indicates the master or slave designation of each of the radios.

9. The method of claim 1 wherein the given device comprises a user device and is operative in at least one additional mode of operation in which each of the plurality of radios is operative to establish a separate and independent connection with one or more access points.

10. The method of claim 1 wherein the given device comprises a user device which in the particular mode of operation communicates in a full-duplex manner with an access point having a plurality of radios one of which is designated as a master radio and one or more of the remaining ones of which are designated as slave radios.

11. The method of claim 1 wherein the given device comprises a user device which in the particular mode of operation communicates in a half-duplex manner with an access point having a plurality of radios one of which is designated as a master radio and one or more of the remaining ones of which are designated as slave radios.

12. A method for use in a wireless network comprising at least one user device configured for communication with at least one access point device, wherein at least a given one of the user device and the access point device comprises a plurality of radios, the method comprising the steps of:

designating one of the plurality of radios of the given device as a master radio and one or more of the remaining radios of the given device as slave radios; and configuring the given device such that in a particular mode of operation the master radio only transmits data and the one or more slave radios only receive data or the master radio only receives data and the one or more slave radios only transmit data;

wherein the given device is operative in at least one additional mode of operation in which data to be transmitted is separated into portions, with certain portions being transmitted by the master radio and other portions being transmitted by the slave radios; and wherein the designating and configuring steps are performed by one or more of the user device and the access point device.

13. The method of claim 12 wherein the data to be transmitted comprises at least one packet, and further wherein the packet is separated into portions, with different portions of the packet being transmitted by the master radio and one or more of the slave radios.

14. The method of claim 12 wherein the portions are transmitted utilizing a predetermined sequence of the plurality of radios beginning with the master radio.

15. The method of claim 14 wherein the predetermined sequence comprises a round-robin sequence which cycles through the plurality of radios.

16. The method of claim 14 wherein after transmission of a final portion of a given piece of data the predetermined sequence is reset such that a first portion of a next piece of data is transmitted by the master radio.

17. An apparatus for use in a wireless network, the apparatus comprising:

a processing device having a processor coupled to a memory, the processing device comprising one of a user device and an access point device of the wireless network;

the processing device further comprising a plurality of radios;

one of the plurality of radios of the processing device being designated as a master radio and one or more of the remaining radios of the processing device being designated as slave radios;

wherein the processing device is configured such that in a first mode of operation the master radio only transmits data and the one or more slave radios only receive data and in a second mode of operation the master radio only receives data and the one or more slave radios only transmit data.

18. A communication system comprising:

a wireless network including at least one user device configured for communication with at least one access point device, wherein at least a given one of the user device and the access point device comprises a plurality of radios;

one of the plurality of radios of the given device being designated as a master radio and one or more of the remaining radios of the given device being designated as slave radios;

wherein the given device is configured such that in a first mode of operation the master radio only transmits data and the one or more slave radios only receive data and in a second mode of operation the master radio only receives data and the one or more slave radios only transmit data.

19. An article of manufacture comprising a machine-readable storage medium storing one or more software programs for use in a wireless network comprising at least one user device configured for communication with at least one access point device, wherein at least a given one of the user device and the access point device comprises a plurality of radios, wherein the one or more programs when executed implement the steps of:

designating one of the plurality of radios of the given user device as a master radio and one or more of the remaining radios of the given user device as slave radios; and configuring the given user device such that in a first mode of operation the master radio only transmits data and the one or more slave radios only receive data and in a second mode of operation the master radio only receives data and the one or more slave radios only transmit data.

* * * * *